(12) United States Patent
Hui

(10) Patent No.: US 6,870,568 B1
(45) Date of Patent: Mar. 22, 2005

(54) PROGRESSIVE/INTERLACE AND REDUNDANT FIELD DETECTION FOR ENCODER

(75) Inventor: Yau Wai Lucas Hui, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 09/857,121

(22) PCT Filed: Dec. 2, 1998

(86) PCT No.: PCT/SG98/00100

§ 371 (c)(1),
(2), (4) Date: Oct. 31, 2002

(87) PCT Pub. No.: WO00/33579

PCT Pub. Date: Jun. 8, 2000

(51) Int. Cl.$^7$ ............................................. H04N 7/01
(52) U.S. Cl. ..................................... 348/458; 348/449
(58) Field of Search ................................ 348/558, 449, 348/451, 452, 441, 448, 700, 459, 443; H04N 7/01

(56) References Cited

U.S. PATENT DOCUMENTS

| | | | |
|---|---|---|---|
| 5,317,398 A | 5/1994 | Casavant et al. ............ 348/570 |
| 5,365,273 A | 11/1994 | Correa et al. ................. 348/452 |
| 5,398,071 A | 3/1995 | Gove et al. .................. 348/558 |
| 5,406,333 A * | 4/1995 | Martin ......................... 348/449 |
| 5,446,497 A * | 8/1995 | Keating et al. .............. 348/443 |
| 5,452,011 A | 9/1995 | Martin et al. ................ 348/526 |
| 5,491,516 A | 2/1996 | Casavant et al. ............ 348/415 |
| 5,508,750 A * | 4/1996 | Hewlett et al. .............. 348/558 |
| 5,565,998 A | 10/1996 | Coombs et al. ............... 386/46 |
| 5,606,373 A * | 2/1997 | Dopp et al. .................. 348/459 |
| 5,689,301 A | 11/1997 | Christopher et al. .......... 348/97 |
| 5,757,435 A | 5/1998 | Wells ........................... 348/441 |
| 6,380,978 B1 * | 4/2002 | Adams et al. ............... 348/452 |

FOREIGN PATENT DOCUMENTS

WO     WO 95/15659     6/1995

* cited by examiner

Primary Examiner—Michael H. Lee
(74) Attorney, Agent, or Firm—Lisa K. Jorgenson; David V. Carlson; Seed IP Law Group PLLC

(57) ABSTRACT

A method of processing video data to detect field characteristics of the data, including processing pixel values of the data to obtain differences between the values of two successive fields of the data, processing the difference values to detect interlace patterns in the successive fields, determining if the successive fields belong to a progressive frame based on detection of the interlace patterns, and generating a progressive frame output indicating that a progressive frame has been detected. The pixel values of the first field of the successive fields and a subsequent field to the successive fields are processed to obtain further difference values to determine if the subsequent field is a redundant field, when the progressive frame output is generated.

28 Claims, 3 Drawing Sheets

PROGRESSIVE/INTERLACE AND REDUNDANT FIELD DETECTION FOR ENCODER

FIELD OF THE INVENTION

The present invention relates to a method and system for processing video data, and in particular for progressive/interlace and redundant field detection for video sources which may be derived from movie film.

BACKGROUND OF THE INVENTION

Encoding methods such as the well known MPEG-1 and MPEG-2 standards had been popularly used for efficient transmission and storage of video. A MPEG encoder compresses an input video signal picture-by-picture to produce an output signal or bitstream compliant to the relevant MPEG standard. Pre-processing techniques can be applied to the input video signal before encoding, for example, to remove noise and re-format the signal (eg. 4:2:2 to 4:2:0 conversion, image size conversion, etc.).

The input video signal is typically in an interlaced format, for example the 525/60 or 625/50 (lines/frequency) format, with each video frame consisting of two fields (top field and bottom field). However, the source material of the video signal may be originally produced on film and converted to the video signal via a telecine process. This process converts a progressive source into an interlaced format and provides at the same time, if necessary, frame rate conversion for example using a 3:2 or 2:2 pulldown technique. In the case of 24 Hz film to 525/60 Hz video conversion, each progressive film picture is converted to two interlaced video fields and, in addition, there are 12 repeated fields according to the 3:2 pulldown patterns in every second of the converted video. Improvement in coding efficiency can be obtained if the video source from film is identified and the repeated (or redundant) fields are detected and removed before coding. Pre-processing techniques applied before encoding can also gain from the results of film picture detection.

Methods for detecting progressive or interlaced frame and/or repeated fields have been known in the prior art. For example, U.S. Pat. Nos. 5,317,398, 5,398,071, 5,491,516, and 5,757,435 disclose methods generally involving a calculation of differences between two adjacent fields of the same parity (top or bottom field) and a comparison of the results of the calculation with some thresholds for repeated field detection and/or with patterns indicative of the 3:2 pulldown process. Methods involving comparison of three adjacent fields of different parity are disclosed in U.S. Pat. Nos. 5,365,273, 5,565,998, and 5,689,301. These methods compare three time adjacent fields, and make decisions based on detection of 3:2 (and 2:2) pulldown patterns. In U.S. Pat. No. 5,452,011, a method utilizing four successive fields is disclosed. This method provides progressive/interlace detection as well as redundant field detection without assumption of fixed 3:2 or 2:2 pulldown pattern. It utilizes both intra-field and inter-field (same and opposite parity) differences.

Although the telecine process of film to video conversion is well understood, and its results are very predictable, the eventual repeated field patterns and number of repeated fields in the converted video may be changed in post-production processes such as scene cuts and overlaying. For example, a sub-title overlay may begin on a repeated field in the converted video, and this will not only break the 3:2 pattern but also create two interlaced frames in a progressive/interlace detection process.

Generally low in complexity, methods utilizing differences of two adjacent fields of the same parity to detect repeated fields lack the ability to detect individual progressive or interlaced frames and lack the ability to detect 2:2 pulldown sequences. Furthermore, these methods do not perform well for 3:2 pulldown sequences with frequent broken 3:2 patterns, and therefore efficiencies of subsequent pre-processing and encoding are affected. Methods involving comparison of three of more adjacent fields of different parity provide the ability to detect both 3:2 and 2:2 pulldown sequences. However, given the fact that fields of different parity are compared, the methods are sensitive to vertical details and vertical motion within the sequences.

Existing methods also suffer from detection latency problems. Basically, the decision of whether or not two fields belong to a same progressive film frame is not made immediately after receiving the second field of the two fields from a video source. Instead, the decision is made by existing methods only after receiving one or more subsequent fields. This has an impact on the total number of field buffers needed in systems such as those including MPEG encoding and necessary pre-processing, as well as adaptivity of the methods to sudden changes in the film/video characteristics.

SUMMARY OF THE INVENTION

In accordance with the present invention, there is provided a method of processing video data to detect field characteristics of the data, including:

processing pixel values of said data to obtain differences between the values of two successive fields of the data;

processing the difference values to detect interlace patterns in said successive fields;

determining if the successive fields belong to a progressive frame based on detection of said interlace patterns; and generating a progressive frame output indicating that a progressive frame has been detected;

wherein said difference values include three difference values of four vertically and temporally spaced pixels of said successive fields, and an interlace pattern is detected when said three difference values each exceed a first predetermined threshold and have the same sign.

The present invention also provides a system of processing video data, including:

means for processing pixel values of said data to obtain difference values between the pixel values of two successive fields of the data;

means for processing the difference to values to detect interlace patterns in said successive fields;

means for determining if the successive fields belong to a progressive frame based on detection of said interlace patterns;

means for generating a progressive frame output indicating that a progressive frame has been detected;

wherein said difference values include three difference values of four vertically and temporally spaced pixels of said successive fields, and an interlace pattern is detected when said three difference values each exceed a first predetermined threshold and have the same sign.

BRIEF DESCRIPTION OF THE DRAWINGS

A preferred embodiment of the present invention is described hereinafter, by way of example only, with reference to the accompanying drawings, wherein.

DETAILED DESCRIPTION OF THE PREFERRED EMBODIMENTS

Figure 1:
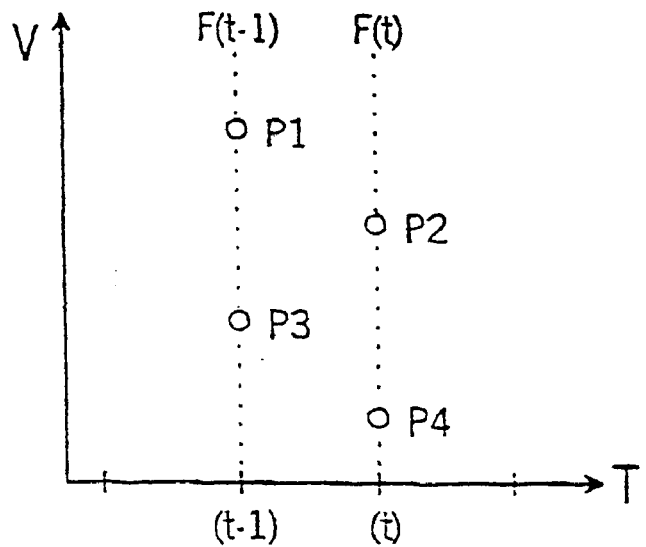
FIG. 1 is a representation of pixels in two successive fields processed by a preferred embodiment of a progressive/interlace and redundant field detector.
Figure 3:
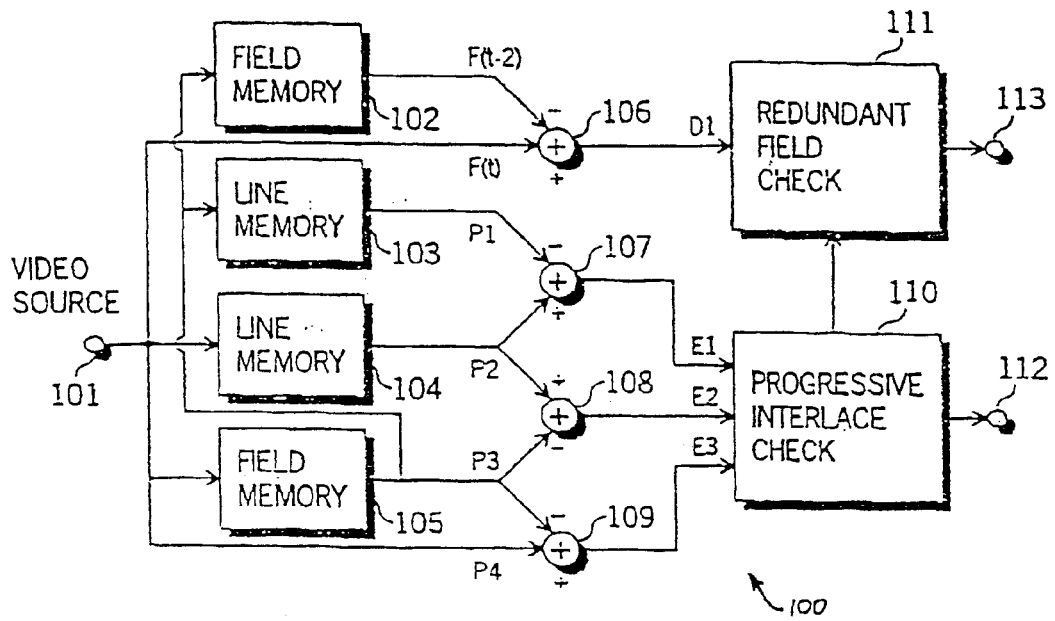
FIG. 3 is a block diagram of the detector.

A progressive/interlace and redundant field detector 100, as shown in FIG. 3, characterises an interlace pattern as being an object area with high inter-field differences, which is detected using four vertically adjacent luminance pixels from two successive fields from a video source. FIG. 1 illustrates an example of four luminance pixels for use in interlace pattern detection in a vertical/temporal plane. The pixels are labelled P1 to P4, wherein pixels P1 and P3 are obtained from a field F(t−1) at time (t−1) and pixels P2 and P4 are sampled from a field F(t) at time t. The differences between vertically adjacent pixels are obtained and compared to a threshold (T1) according to the following pseudo-code for interlace pattern detection:

if {(P1−P2)>T1 and (P3−P2)>T1 and (P3−P4)>T1} or {(P2−P1)>T1 and (P2−P3)>T1 and (P4−P3)>T1} interlace pattern detected.

The two successive fields are determined as interlaced if there are sufficient areas within the two fields containing interlace patterns, or in other words, sufficient numbers of interlace patterns being detected.

Figure 2:
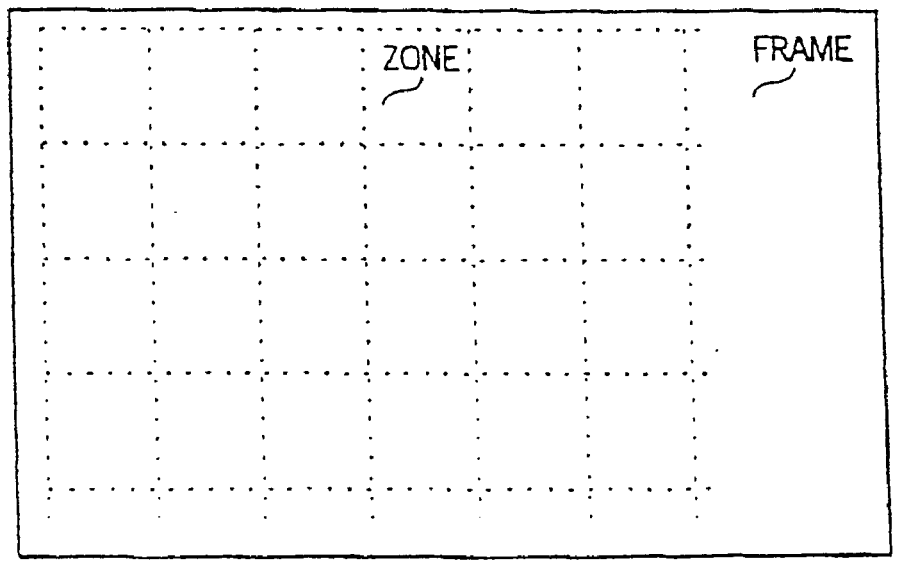
FIG. 2 is a diagram of zones of a frame processed by the detector.

To increase flexibility and detection accuracy, a frame consisting of two successive fields is divided into zones, as illustrated in FIG. 2, by the detector. Each zone is examined independently for the interlace patterns, and decision on progressive/interlace processing is made based on the number of zones containing sufficient area of interlace patterns. Within a zone, luminance pixels are scanned to obtain a sequence of four vertically adjacent pixel set (P1 to P4) for interlace pattern detection. The sequence contains no overlapping pixels, and it is possible to define the zones such that P1 is always above P2. Furthermore, the position and size of the zones may be adjusted depending on application needs, or timing and buffering requirements.

When two successive fields are detected as a progressive frame, a subsequent field is compared to the first of the two successive fields for redundant field detection. Redundant fields may be created by the 3:2 pull-don process for movie film source, or due to a lack of movement in the program material. However, detection and removal of redundant fields due to lack of movement or 3:2 pull-down may both be useful for example in MPEG encoding. Information about the removed fields can be coded by a MPEG-2 encoder, and the removed fields are re-created at the MPEG-2 decoder by repeating the original fields according to the coded information. It is noted that there are constraints in MPEG-2 for field repeating and, in cases where such restraints apply, redundant field detection can be disabled.

FIG. 3 illustrates one embodiment of a progressive/interlace and redundant field detector 100. Luminance signals from a video source 101 are provided as an input to the detector 100, and the video source input is coupled to a field memory 105 and a line memory 104 of the detector. The field memory 105 and line memory 104 act as delay buffers for a field and line of the input luminance signals, respectively. The output of the field memory 105 is coupled to the inputs of additional field and line memories 102, 103 respectively. In view of the delaying effect of the field memories, if the current field supplied by the video source input 101 is designated F(t), the output of field memory 105 represents the previous field F(t−1), and the output of field memory 102 represents the field preceding that, namely F(t−2). The line memories 103, 104 merely buffer respective lines of pixel data from fields F(t−1) and F(t), respectively. The video source luminance signals which are delayed and buffered using field memory 105 and the two line memories 103 and 104 are used to generate a sequence of four vertically spaced pixels (P1 to P4) according to a predetermined zone location. Noise reduction techniques may be applied to the video source 101 ahead of time such that accuracy of the detection is improved. Alternate ways of generating the sequence of pixels P1 to P4 are possible and will be apparent those skilled in the art.

Three subtractors 107, 108 and 109 are provided with inputs from the video source 101 and the field and line memories 103, 104 and 105. In particular, the output of line memory 103 representing pixel value P1 and the output of line memory 104 representing pixel value P2 are coupled to the subtracter 107. The output of line memory 104 and the output of field memory 105 representing pixel value P3 are coupled to the subtractor 108. The output of field memory 105 and the video source 101 providing pixel value P4 are coupled to the subtractor 109. This arrangement is utilised to obtain difference signals E1, E2 and E3 from the outputs of the respective subtractors 107, 108, and 109 according to:

$$E1=(P2-P1)$$

$$E2=(P2-P3)$$

$$E3=(P4-P3)$$

The difference signals are inputted to a progressive/interlace check circuit 110 to generate a progressive/interlace decision output 112 for a pair of successive fields from the video source. The difference signals are used to indicate video objects and interlace patterns. Depending on the positions of the defined zones, the progressive/interlace decision is made after completely or almost completely receiving the second of the two successive fields. A MPEG encoder and any pre-processor associated with the MPEG encoder may make use of the progressive/interlace decision output immediately. The progressive/interlace check circuit 110 is described in greater detail below.

In the detector 100, another subtractor 106 is also provided, with inputs from the field memory 102 (−) and the video source 101 (+). The output of the subtractor 106 is a difference signal D1. Thus, if the two successive fields are detected as a progressive frame, a subsequent field from the video source is compared to the first of the two successive fields for redundant field detection. Basically, field memories 105 and 102 are used such that the two fields (labelled as F(t−2) and F(t)) can be compared at the appropriate time. The difference signal D1 is generated from F(t−2) and F(t) using the subtractor 106, and subjected to a redundant field check by a circuit 111 to generate a redundant field decision output 113. The structure of the redundant field check circuit 111 is described in greater detail hereinbelow.

Figure 4:
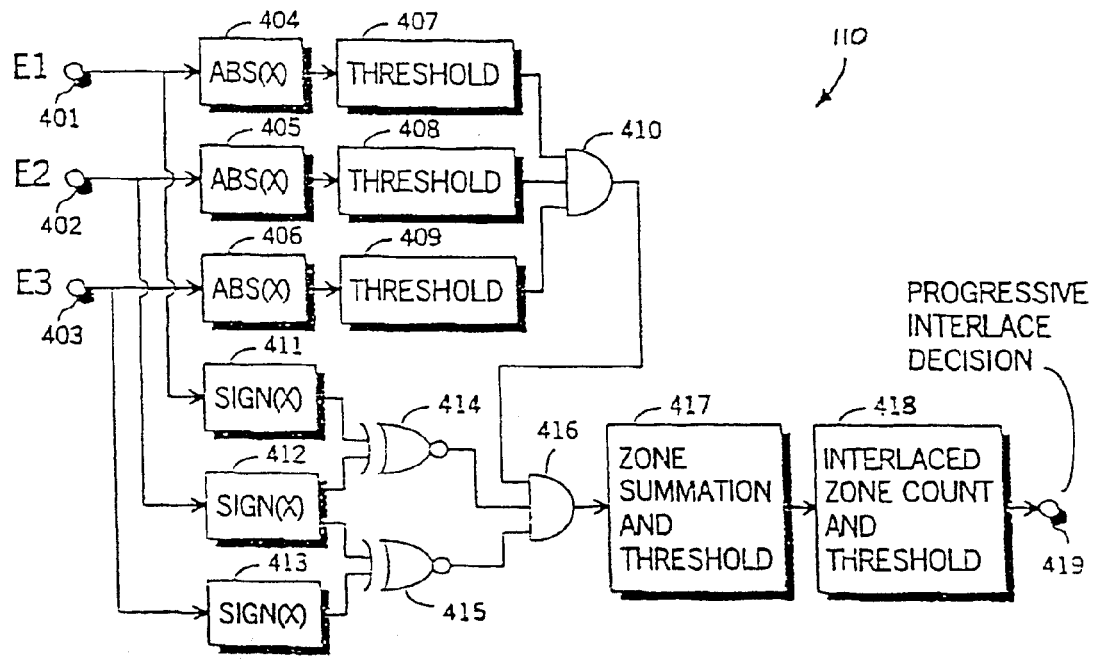
FIG. 4 is a block diagram of a progressive/interlace check circuit of the detector.

The progressive/interlace check circuit utilises the difference signals E1 to E3, as shown in FIG. 4. To detect an interlace pattern in a video object, it is assumed that the video object is distinguishable from the video background and that the video object moves. In effect, E1, E2, and E3 should all have large enough magnitude and have the same sign magnitude. The difference signals E1, E2, and E3 are provided to the progressive/interlace check circuit 110 at respective inputs 401, 402 and 403. These inputs are coupled to detect the sign magnitudes of E1, E2, and E3 by respective SIGN(X) processing blocks 411, 412, and 413. The outputs of the SIGN(X) blocks 411 and 412 are coupled as inputs to an XOR gate 414 and the outputs of the SIGN(X) blocks 412 and 413 are coupled as inputs to an XOR gate 415. The purpose of the XOR operations is to check that the signs of the difference signals E1, E2, and E3 are all equal, and if they are then the outputs of both XOR gates will be true. The outputs of the XOR gates are coupled as inputs to an AND gate 416. Absolute magnitudes of E1, E2, and E3 are obtained by ABS(X) processing blocks 404, 405, and 406 respectively, and checked to be all greater than a threshold T1 in respective threshold comparators 407, 408, and 409 and an AND operation 410. The output of AND gate 410 is also provided as an input to the AND gate 416 in order to ascertain that the signs of the difference signals are all the same and the magnitudes are all greater than the threshold. If the output of the AND gate 416 is true, then an interlace pattern has been detected in the respective zone from which the pixels represented by difference signals E1, E2, and E3 have been taken.

The number of detected interlace patterns in each defined zone is summed together and compared to another threshold T2 in a zone summation and threshold process 417. This summation gives a measure of whether or not a particular zone contains sufficient area (relative to the threshold T2) with interlace patterns. Finally, the number of zones with sufficient area of interlace patterns is counted and compared with a third threshold T3 in a zone count and threshold process 418. If the number of zones with interlace patterns exceeding T2 is greater than the threshold T3, an interlaced frame is detected, else a progressive frame is detected. The detection result is provided at a progressive/interlace decision output 419.

Figure 5:
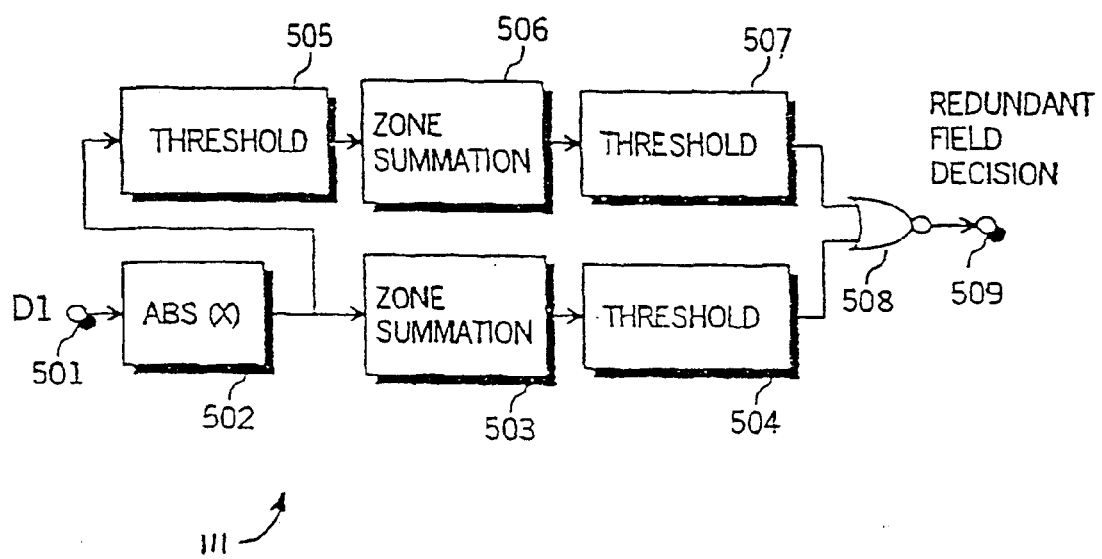
FIG. 5 is a block diagram of a redundant field check circuit of the detector.

The redundant field check circuit 111 uses the inter-field difference signal D1 as illustrated in FIG. 5. In this circuit 111, an average difference as well as a measure of area of large difference within a zone are computed and compared to respective threshold values. The inter-field difference signal D1 is provided to the redundant field check circuit 111 at an input 501, and an absolute value is obtained by ABS(X) 502. The output of the absolute value determination is subjected to a zone summation 503. The zone summation 503 produces an average difference for each defined zone which is then compared to a threshold T4 in a threshold comparator 504. The absolute value of D1 is also compared to another threshold T5 in a threshold comparator 505 to check for areas of large difference. The number of pixels greater than threshold T5 in each zone is summed at zone summation 506, and the result for each zone is compared to a threshold T6 in another threshold comparator 507. The outputs of threshold comparators 504 and 507 are provided as input to an OR gate 508 which generates a redundant field decision output 509 by checking if none of the zones has average difference greater that T4 and area of large difference greater than T6. All thresholds may be determined with respective zone sizes and applications.

It will be apparent to skilled person in the art that a redundant field detector in accordance with the present invention may be modified to include scene change detection. Furthermore, it is possible that with the scene change detection function, the redundant field detector may improve detection accuracy by enforcing repetitive 3:2 patterns within each scene.

The above described embodiment of the present invention utilizes a minimal number of fields for progressive/interlace detection useful for buffer memory reduction in encoding applications. The progressive/interlace detection method has good detection accuracy including sequences containing motion acceleration/deceleration, vertical motion, and diagonal edges. Decisions on progressive/interlace detection can thus improve efficiency in encoding as well as pre-processing. Accuracy of redundant field detection is improved with better progressive/interlace detection. Removal of redundant fields therefore significantly enhance encoding quality.

The method and apparatus for progressive/interlace and redundant field detection may be incorporated in an encoder according to the ISO/IEC MPEG standards (ISO/IEC 11172-2 MPEG-1 and ISO/IEC 13818-2 MPEG-2) for video sources originally derived from movie film. The progressive/interlace and redundant field detectors improve significantly the MPEG pre-processing and compression efficiency, and the system is designed to minimize the delay incurred and thus minimize the overall system memory requirements and system costs. The main application is low cost high quality digital video recorder (eg. DVD-RAM, SVCD, CVD, etc.) for consumers.

The foregoing detailed description of the preferred embodiment has been presented by way of example only, and is not intended to be considered limiting to the invention as defined in the claim appended hereto.

What is claimed is:

1. A method of processing video data to detect field characteristics of the data, including:

processing pixel values of said data to obtain differences between the values of two successive fields of the data;

processing the difference values to detect interlace patterns in said successive fields;

determining if the successive fields belong to a progressive frame based on detection of said interlace patterns; and generating a progressive frame output indicating that a progressive frame has been detected;

wherein said difference values include three difference values of four vertically and temporally spaced pixels of said successive fields, and an interlace pattern is detected when said three difference values each exceed a first predetermined threshold and have the same sign.

2. A method as claimed in claim 1, including:

processing pixel values of a first field of said successive fields and a subsequent field of said successive fields to obtain further difference values; and processing said further difference values to determine if said subsequent field is a redundant field, when said progressive frame output is generated.

3. A method as claimed in claim 1, including allocating said pixel values of said frames to zones, said zones representing respective areas of said fields, and detecting said interlace patterns in said zones based on respective ones of said difference values in said zones.

4. A method as claimed in claim 1, wherein P1 and P3 are pixel values of a first field of said successive fields, and P2 and P4 are pixel values of a second field of said successive fields, and the said pixel values P1, P2, P3 and P4 are of respective adjacent horizontal lines of said fields, and said difference values are P2–P1, P3–P2 and P4–P3.

5. A method as claimed in claim 4, including detecting an interlaced zone when the sum of said interlace patterns detected in a zone exceeds a second predetermined threshold.

6. A method as claimed in claim 5, wherein said progressive frame output is generated when the sum of the interlaced zones for said successive fields is less than a third predetermined threshold.

7. A method as claimed in claim 6, further comprising:
processing pixel values of the first field of said successive fields and a subsequent field of said processing fields to obtain further difference values; and
processing said further difference values to determine if said subsequent field is a redundant field, when said progressive frame output is generated;
wherein said further difference values comprise differences between corresponding pixel values of said first field of said successive fields and said subsequent field.

8. A method as claimed in claim 7, including summing said further difference values obtained for said zones of the first field and the subsequent field and determining the average further difference value for each zone, and detecting a high average difference when at least one of said average difference values exceeds a fourth predetermined threshold.

9. A method as claimed in claim 8, including comparing said further difference values for a zone with a fifth predetermined threshold to detect a large difference, detecting a zone large difference when the sum of said large differences for a zone exceeds a sixth predetermined threshold.

10. A method as claimed in claim 9, wherein said subsequent field is determined as being a redundant field when at least one of said high average difference and said zone large difference is detected for said first field and said subsequent field.

11. A system of processing video data, including:
means for processing pixel values of said data to obtain difference values between the pixel values of two successive fields of the data;
means for processing the difference to values to detect interlace patterns in said successive fields;
means for determining if the successive fields belong to a progressive frame based on detection of said interlace patterns;
means for generating a progressive frame output indicating that a progressive frame has been detected;
wherein said difference values of a zone include three difference values of four vertically and temporally spaced pixels of said successive fields, and an interlace pattern is detected when said three difference values each exceed a first predetermined threshold and have the same sign.

12. A system as claimed in claim 11, including:
means for processing pixel values of a first field of said successive fields and a subsequent field of said successive fields to obtain further difference values; and
means for processing said further difference values to determine if said subsequent field is redundant field, when said progressive frame output is generated.

13. A system as claimed in claim 11, wherein said pixel values of said frames are allocated to zones, said zones representing respective areas of said fields, and said processing means detects interlace patterns in said zones on respective ones of said difference values in said zones.

14. A system as claimed in claim 11, wherein P1 and P3 are pixel values of a first field of said successive fields, and P2 and P2 are pixel values of a second field of said successive fields, and the said pixel values P1, P2, P3 and P4 are of respective adjacent horizontal lines of said fields, and said difference values are P2–P1, P3–P2 and P4–P3.

15. A system as claimed in claim 14, including means for detecting an interlaced zone when the sum of said interlace patterns detected in a zone exceeds a second predetermined threshold.

16. A system as claimed in claim 15, wherein said progressive frame output is generated when the sum of the interlaced zones for said successive fields is less than a third predetermined threshold.

17. A system as claimed in claim 16, further comprising:
means for processing pixel values of the first field of said successive fields and a subsequent field of said successive fields to obtain further difference values; and
means for processing said further difference values to determine if said subsequent field is redundant field, when said progressive frame output is generated;
wherein said further difference values comprise differences between corresponding pixel values of said first field of said successive fields and said subsequent field.

18. A system as claimed in claim 17, including means for summing said further difference values obtained for said zones of the first field and the subsequent field and determining the average difference value for each zone, and means for detecting a high average difference when at least one of said average difference values exceeds a fourth predetermined threshold.

19. A system as claimed in claim 18, including means for comparing said further difference values for a zone with a fifth predetermined threshold to detect a large difference, and means for detecting a zone large difference when the sum of said large differences for a zone exceeds a sixth predetermined threshold.

20. A system as claimed in claim 19, wherein said subsequent field is determined as being a redundant field when at least one of said high average difference and said zone large difference is detected for said first field and said subsequent field.

21. A method of processing video data to detect field characteristics of the data, comprising:
processing pixel values of said data to obtain comparison values between two successive fields of said data;
processing the comparison values to detect interlace patterns in said successive fields;
determining if the successive fields belong to a progressive frame based on detection of said interlace patterns; and
generating a progressive frame output indicating that a progressive frame has been detected;
wherein said comparison values include three comparison values of four vertically and temporally spaced pixels of said successive fields, and an interlace pattern is detected when said three comparison values each exceed a predetermined threshold.

22. A method as claimed in claim 21, further comprising:
processing pixel values of a first field of said successive fields and a subsequent field of said successive fields to obtain further comparison values; and
processing said further comparison values to determine if said subsequent field is a redundant field, when said progressive frame output is generated.

23. A method as claimed in claim 21, further comprising allocating said pixel values of said frames to zones, said zones representing respective areas of said fields, and detecting said interlace patterns in said zones based on respective ones of said comparison values in said zones.

24. A method as claimed in claim 21, wherein the step of processing pixel values to obtain comparison values includes computing differences between pixels of a first field and corresponding pixels of a subsequent field of said successive fields.

25. A system for processing video data to detect field characteristics of the data, comprising:

means for processing pixel values of said data to obtain comparison values between two successive fields of said data;

means for processing the comparison values to detect interlace patterns in said successive fields;

means for determining if the successive fields belong to a progressive frame based on detection of said interlace patterns; and means for generating a progressive frame output indicating that a progressive frame has been detected;

wherein said comparison values include three comparison values of four vertically and temporally spaced pixels of said successive fields, and an interlace pattern is detected when said three comparison values each exceed a predetermined threshold.

26. A system as claimed in claim 24, further comprising:

means for processing pixel values of a first field of said successive fields and a subsequent field of said successive fields to obtain further comparison values; and means for processing said further comparison values to determine if said subsequent field is a redundant field when said progressive frame output is generated.

27. A system as claimed in claim 24, further comprising means for allocating said pixel values of said frames to zones, said zones representing respective areas of said fields, and means for detecting said interlace patterns in said zones based on respective ones of said comparison values in said zones.

28. A system as claimed in claim 24, wherein the means for processing pixel values to obtain comparison values includes means for computing differences between pixels of a first field and corresponding pixels of a subsequent field of said successive fields.

* * * * *

UNITED STATES PATENT AND TRADEMARK OFFICE
CERTIFICATE OF CORRECTION

| | |
|---|---|
| PATENT NO. | : 6,870,568 B1 |
| DATED | : March 22, 2005 |
| INVENTOR(S) | : Yau Wai Lucas Hui |

It is certified that error appears in the above-identified patent and that said Letters Patent is hereby corrected as shown below:

Column 8,
Lines 2 and 3, "a first field of said successive fields, and P2 and P2" should read -- a first
field of said successive fields, and P2 and P4 --.

Signed and Sealed this

Sixth Day of September, 2005

JON W. DUDAS
*Director of the United States Patent and Trademark Office*